2,701,263

METHOD OF MAKING BIS (3-AMINOPROPYL) ETHER

Edward A. Wielicki, Philadelphia, and Ellis Lewis, Jr., Jenkintown, Pa., assignors to American Viscose Corporation, Wilmington, Del., a corporation of Delaware No Drawing. Application May 6, 1952,
Serial No. 286,448

2 Claims. (Cl. 260—584)

This invention relates to bis(3-aminopropyl) ether and to an improved process for its preparation by hydrogenation of bis(2-cyanoethyl) ether.

Our attempts to isolate bis(3-aminopropyl) ether from a mass obtained by catalytically hydrogenating bis(2-cyanoethyl) ether in solution in various solvents, such as ethyl alcohol and liquid ammonia, have not been successful apparently because, under the conditions required for the hydrogenation, the bis(3-aminopropyl) ether produced is alkaline and tends to cleave itself at the ether linkage.

The present invention provides a new method for catalytically hydrogenating bis(2-cyanoethyl) ether in which cleavage of the bis(3-aminopropyl) ether formed is prevented or inhibited.

In accordance with the invention, the bis(2-cyanoethyl) ether is catalytically hydrogenated in the presence of a normally liquid fatty acid anhydride which reacts with bis(3-aminopropyl) ether as it is formed to produce the corresponding bis(3-acylaminopropyl) ether with the result that, after hydrolysis of the acyl groups, which can be accomplished under conditions which do not favor cleavage at the oxygen linkage, the bis(3-aminopropyl) ether is obtained in acceptable yield and in a high state of purity.

The process may be carried out as follows: A solution of bis(2-cyanoethyl) ether in the selected organic acid anhydride, in a proportionate molar ratio of one mole of the ether to at least two moles of the anhydride is charged into an agitated vessel capable of withstanding increased pressure, together with a suitable finely divided hydrogenation catalyst, hydrogen under pressure is admitted and the reaction is continued until the absorption of hydrogen ceases, after which the catalyst is filtered off, any excess anhydride is removed together with any organic acid formed as by-product, and the hydrogenation product is hydrolyzed.

While the bis(2-cyanoethyl) ether and organic acid anhydride may be used in a molar ratio of one mole of the ether to two moles of the anhydride it is preferred to use an amount of the anhydride in excess of the theoretical, for example, from 2.5 to 3 moles of the anhydride to one mole of the ether.

The reaction is carried out with agitation and under increased pressure, preferably under a pressure between 1000 lbs. per square inch and 4000 lbs. per square inch, and as the absorption of hydrogen continues additional incremental quantities of hydrogen may be introduced into the reaction vessel as may be required to maintain the pressure substantially constant. The reaction may set in at room temperature but is preferably initiated by warming the contents of the reaction vessel to a temperature between 45° C. and 55° C. The reaction is exothermic and after it has been initiated external heating may be discontinued. Since high temperatures induce undesirable side reactions with the production of by-products such as secondary amines, it is desirable to control the temperature so that it does not exceed about 70° F. The preferred temperature range is from 45° C. to 70° C. If the temperature rises above 70° C., the agitation may be interrupted until the temperature drops to below 70° C.

Any normally liquid fatty acid anhydride may be used in carrying out the invention. Such anhydrides are those having the formula $(RCO)_2O$ in which R is an alkyl radical containing from 1 to 10 carbon atoms and include acetic anhydride, propionic anhydride, butyric anhydride, valeric anhydride and caprylic anhydride.

The following example, in which parts are by weight, is illustrative of the invention.

Example

One hundred and twenty-four parts of bis(2-cyanoethyl) ether were dissolved in 347 parts of acetic anhydride, 7.5 parts of Raney nickel catalyst were added and the solution was charged into a rocking autoclave. Hydrogen was introduced until the pressure in the autoclave was 3930 lbs. per square inch. The agitated autoclave was warmed to 50° C., after which external heating was discontinued, rocking of the autoclave being continued. Absorption of hydrogen commenced with an exothermic rise in temperature which was not allowed to go above 70° C. Hydrogen was absorbed rapidly over a period of three hours, the total pressure in the autoclave being maintained by adding fresh amounts of hydrogen as needed from high pressure storage tanks. After the absorption of hydrogen ceased, rocking of the autoclave was terminated, unabsorbed hydrogen was vented off, the autoclave was opened and the mixture was filtered to separate the catalyst. The excess acetic anhydride was distilled off under vacuum, together with acetic acid formed as by-product. The bis(3-acetylaminopropyl) ether was allowed to crystallize from the residue of the distillation, and was recrystallized from acetone. It had a melting point of 70° C.–71° C. The purified diacetylated compound was dissolved in water and solid potassium hydroxide was added until the solution was strongly alkaline. A solution of 112 parts of potassium hydroxide in 250 parts of water was added and the mixture was refluxed for two hours to hydrolyze the bis(3-acetylaminopropyl) ether to bis(3-aminopropyl) ether. The reaction mixture was allowed to cool and solid potassium hydroxide was added until an oil layer separated. The oil layer was drawn off and diluted with 1000 parts of dioxane to precipitate the potassium hydroxide. The dioxane solution was then dried thoroughly in a dessicator over solid potassium hydroxide to remove any water present in the oil, and filtered to remove the precipitated potassium hydroxide. The dioxane was removed by distillation and the residue from that distillation was distilled under reduced pressure to obtain bis(3-aminopropyl) ether having a boiling point of 62° C.–63° C. at 0.2 mm. abs. pressure. The ether had a density at 24° C. of 0.9412; refractive index $n_D^{24°} = 1.4600$.

Although in the example an activated nickel catalyst is used, hydrogenation catalysts in general are operative in the present process and there may be used hydrogenation catalysts comprising, as the essential component thereof, a hydrogenating metal such as platinum, palladium, cobalt, copper or silver or the oxides or salts of such metals, as well as the base metals of the eighth group of the periodic table generally and their oxides and salts. The compounds of zinc which are commonly used as hydrogenation catalysts are also operative in this process. The amount of catalyst used may be varied but in general it is preferred to use from 3% to 15% by weight of the catalyst, based on the weight of the bis(2-cyanoethyl) ether.

Other methods of hydrolyzing as bis(3-acylaminopropyl) ether obtained initially may be used. For example, instead of treating the hydrogenation product with aqueous potassium hydroxides, aqueous solutions of other alkali metal hydroxides, for instance sodium hydroxide may be used, or the hydrolysis may be effected by treating the hydrogenation product with liquid ammonia or ammonium hydroxide.

Instead of the dioxane used in the example for precipitating the alkali metal hydroxide, other organic solvents may be used. Dioxane is presently preferred.

The dioxane solution remaining after filtering off the precipitated alkali metal hydroxide may be dried over any suitable dehydrating material. For instance in place of the solid potassium hydroxide used in the example, there may be used sodium hydroxide, barium hydroxide and other hygroscopic materials.

The bis(2-cyanoethyl) ether employed as starting material may be obtained by reacting acrylonitrile with ethylene cyanhydrin in an aqueous medium containing an alkaline condensing agent such as sodium hydroxide.

The bis(3-aminopropyl) ether may be employed in the synthesis of polymeric amides, and to modify other resins that are used in the manufacture of plastics, coating compositions and the like.

Since various modifications may be made in practicing the invention without departing from the spirit and scope thereof, it is to be understood that the invention is not to be limited to the specific embodiment thereof except as defined in the appended claims.

We claim:

1. In a process for the production of bis(3-aminopropyl) ether by catalytically hydrogenating bis(2-cyanoethyl) ether, the improvement which comprises carrying out the hydrogenation in the presence of at least two moles of a normally liquid fatty acid anhydride per mole of bis(2-cyanoethyl) ether, said anhydride being selected from those having the formula $(RCO)_2O$ in which R is an alkyl radical containing from 1 to 10 carbons, and heating the hydrogenation product in an alkali metal hydroxide hydrolyzing medium to produce bis(3-aminopropyl) ether.

2. In a process for the production of bis(3-aminopropyl) ether by catalytically hydrogenating bis(2-cyanoethyl) ether, the improvement which comprises carrying out the hydrogenation in the presence of at least two moles of acetic anhydride per mole of bis(2-cyanoethyl) ether, and heating the hydrogenation product in an alkali metal hydroxide hydrolyzing medium to produce bis(3-aminopropyl) ether.

References Cited in the file of this patent

FOREIGN PATENTS 460,099   Canada _____ Oct. 4, 1949

OTHER REFERENCES

Whitmore et al., J. A. C. S., vol. 66, pp. 725–731 (1944).

Wiley, J. A. C. S., vol. 68, p. 1867 (1946).